(12) United States Patent
Legrand

(10) Patent No.: US 7,248,185 B2
(45) Date of Patent: Jul. 24, 2007

(54) POSITION SENSOR WITH UNBALANCED CYCLIC RATIO

(75) Inventor: Bertrand Legrand, Grenoble (FR)

(73) Assignee: Electricfil Automotive, Miribel Cedex (FR)

( * ) Notice: Subject to any disclaimer, the term of this patent is extended or adjusted under 35 U.S.C. 154(b) by 0 days.

(21) Appl. No.: 11/329,394

(22) Filed: Jan. 11, 2006

(65) Prior Publication Data

US 2006/0152388 A1 Jul. 13, 2006

(30) Foreign Application Priority Data

Jan. 12, 2005 (FR) .................................. 05 00288

(51) Int. Cl.
*H03M 1/22* (2006.01)
(52) U.S. Cl. ....................................................... 341/15
(58) Field of Classification Search .................. 341/15, 341/9; 318/34, 118
See application file for complete search history.

(56) References Cited

U.S. PATENT DOCUMENTS 4,375,088 A * 2/1983 de Haan et al. ......... 369/44.13

5,699,058 A * 12/1997 Yanagisawa et al. ......... 341/13
5,898,301 A 4/1999 La Croix et al. ....... 324/207.22
2006/0186879 A1* 8/2006 Legrand ................ 324/207.25

FOREIGN PATENT DOCUMENTS

EP 1396629 3/2004
FR 2808325 11/2001

* cited by examiner

*Primary Examiner*—Peguy JeanPierre
(74) *Attorney, Agent, or Firm*—Dennison, Schultz & MacDonald

(57) ABSTRACT

A sensor including at least one rotary magnetic coder with first and second rotary tracks, at least two detection cells, and logical resources for processing of digital signals delivered by the cells. At least the detection cell located in relation to a magnetic track with a singular pole is a single-element detection cell, and the generator elements of the magnetic tracks and the detection cells are arranged in dependence on the logical processing resources such that the digital output signal has the same constant period, both on its regular coding part and on its irregular coding part, and the regular coding part and the irregular coding part have cyclic ratios that are unbalanced and different from each other.

12 Claims, 3 Drawing Sheets

POSITION SENSOR WITH UNBALANCED CYCLIC RATIO

BACKGROUND OF THE INVENTION

The subject of the invention concerns the technical area of rotary magnetic sensors, of the type that includes a coder element moving close to a detection cell and designed to read off at least one angular position in the general sense.

The subject of the invention finds a particularly advantageous application in the automobile area in which such a sensor can be used, for example, in the context of ignition functions.

In the above preferred area, it is common to produce a magnetic sensor designed to measure changes in the intensity of a magnetic field, when a coder equipped with a series of elements generating a variable magnetic field moves in front of one or more measurement or detection cells. Each detection cell, such as, for example, a Hall-Effect or magneto-resistive probe, delivers a periodic electrical signal corresponding to changes in the intensity of the magnetic field generated by the elements. Each detection cell is associated with a hysteresis type level comparator, such as Schmitt trigger, in order to obtain sharp transitions of the output voltage for distinct values of the magnetic field, according to whether it varies upwards or downwards.

In order to constitute a sensor for detection of a speed of rotation, it is common to create a coder that is equipped with elements that generate a variable magnetic field, arranged in a regular manner along a circumference.

According to a first form of implementation, the generating elements are composed of elements that disrupt a magnetic field created by a fixed magnet placed close to such disruptive elements. As an example, such disruptive elements are composed of teeth arranged in a ferromagnetic ring.

According to a second form of implementation, the generating elements of a variable magnetic field are formed by magnetic poles, regularly spaced with a given pitch. Such a coder thus comes in the form of a multipolar magnetic ring.

To allow the determination of at least one position, corresponding, for example, to the top dead centre point in the ignition of a cylinder, it is common to create a marker on the magnetic coder which is commonly known as a singular or irregular pole. It is also common, for example, to remove two teeth from the ferromagnetic ring. In the implementation variant using a coder made in the form of a multipolar magnetic ring, it is possible to envisage either removing several magnetic poles leaving an empty space, or replacing one or more poles of a given polarity with one or more poles of an opposite polarity. One thus creates a given magnetising pole which has, between its two adjacent poles of opposite polarity, a spacing pitch that differs from the spacing pitch of the other poles.

Such a sensor thus delivers a digital output signal with a regular coding part with a constant period and an irregular coding part with a different and longer period. In practice, this leads to a difficulty for the exploitation of such a signal given, in particular, its non-periodic character at the level of the singular pole.

SUMMARY OF THE INVENTION

The subject of the invention therefore aims to remedy the disadvantages of the previous designs by proposing a rotary magnetic sensor that can be used to locate at least one position while also delivering a periodic signal over a full turn of the sensor.

In order to attain this objective, the subject of the invention concerns a sensor that includes:

- at least one rotary magnetic coder with at least one first circular magnetic track formed by a series of generator elements of a variable magnetic field, distributed so as to form $N_1$ element pairs with a specified period, and a second circular magnetic track formed by a series of generator elements of a variable magnetic field, distributed so as to form $N_2$ element pairs with a specified period, where at least one of the magnetic tracks has at least one singular pole with at least one pair of singular generator elements with a different spacing pitch in relation to the spacing pitch of the other generator elements,
- at least two detection cells, each placed in relation to a magnetic track and each delivering an electrical signal that corresponds to changes in the intensity of the magnetic field, the detection cells or the magnetic tracks being offset from each other to allow the production of two de-phased digital signals,
- and resources for logical processing of the digital signals delivered by the cells, designed to deliver a digital output signal with, firstly, a regular coding part with an alternating succession of high levels and low levels corresponding to a specified cyclic ratio and, secondly, an irregular coding part with at least one high level and one low level corresponding to a specified cyclic ratio.
  According to the invention:
    - at least the detection cell, located in relation to the magnetic track with a singular pole, is a single-element detection cell,
    - and the generator elements of the magnetic tracks and the detection cells are arranged so that, depending on the logical processing resources, the digital output signal has a given constant period, both on its regular coding part and its irregular coding part, the regular coding part and the irregular coding part having cyclic ratios that are unbalanced and different from each other.

According to one advantageous implementation characteristic, the generator elements of the magnetic tracks and the detection cells are arranged so that, depending on the logical processing resources, the digital output signal has a regular coding part whose unbalanced cyclic ratio is complementary to the unbalanced cyclic ratio of the irregular part.

For example, at least one magnetic track has at least one singular pole, while the other track has only element pairs with a specified period.

According to one implementation characteristic, the $N_1$ pairs of generator elements of the first magnetic track have a period equal to the period of the $N_2$ pairs of generator elements of the second magnetic track.

The sensor according to the invention employs logical processing resources which take account of either one or other of the digital signals, or the complement of one or the other of the digital signals.

It should be noted that the detection cells or the magnetic tracks are offset from each other according to one of the constituent values of the unbalanced cyclic ratio.

Preferably, the generator elements are formed by alternating North and South magnetic poles.

According to one particular form of implementation, the alternating North/South magnetic poles extend in a continuous manner and inclined in relation to the direction of movement of the coder, with the magnetic poles forming the generator elements being of constant thickness, while at least some of the singular generator elements have a thickness that increases or decreases in the direction of the edges of the coder.

According to another particular form of implementation, the generator elements of the two tracks are formed by common alternating North and South magnetic poles, extending crosswise in relation to the direction of movement of the coder, the singular generator elements being formed by alternating North/South magnetic poles of different widths, while the cells are offset from each other in the direction of movement of the coder.

According to a preferred application, the magnetic coder is fixed in rotation on a shaft of a vehicle engine.

BRIEF DESCRIPTION OF THE DRAWINGS

Various other characteristics will emerge from the description that follows, with reference to the appended drawings which show, by way of non-limited examples, forms of implementation of the subject of the invention.

DESCRIPTION OF THE PREFERRED EMBODIMENTS

Figure 1:
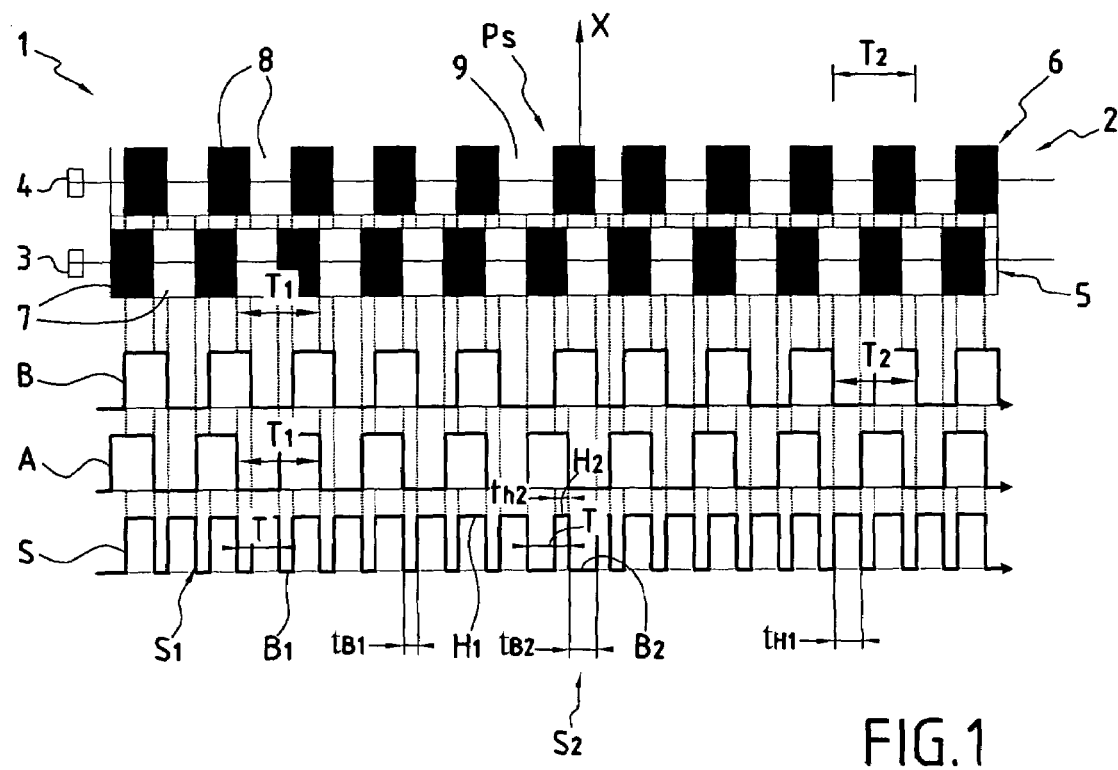
FIG. 1 illustrates one example of implementation of a sensor according to the invention.

FIG. 1 illustrates a first implementation variant of a rotary magnetic sensor 1 with a rotary magnetic coder 2 driven in rotation around an axis x by any appropriate means. The coder 2 is intended move in front of at least two fixed detection cells 3, 4 each connected to logical processing resources, not shown but known as such, which deliver a digital output signal S. It should be considered that a detection cell 3, 4 includes at least one element that is sensitive to the variable magnetic field.

In the illustrated example, the coder 2 includes a first circular track 5 and a second circular track 6, each respectively intended to move in front a cell 3, 4. It should be considered that the two tracks 5, 6 can be adjoining or not, so that, in the meaning of the invention, a magnetic track corresponds to the part of the coder which, during its passage, moves in front of a cell.

The first magnetic track 5 is formed by a series of generator elements 7 of a variable magnetic field, distributed so as to former $N_1$ element pairs with a specified period $T_1$. In the illustrated example, the generator elements 7 are formed by alternating north and south magnetic poles shown respectively in black and white in FIG. 1. In the example illustrated in FIG. 1, the north and south poles 7 have the same regular separation pitch, so that they have the same width.

Likewise, the second magnetic track 6 is formed by a series of generator elements 8 of a variable magnetic field distributed so as to form $N_2$ element pairs with a specified period $T_2$. In the illustrated example, the generator elements 8 are formed by alternating north and south magnetic poles shown, respectively, in black and white in FIG. 1. In the example illustrated in FIG. 1, the north and south poles 8 have the same regular separation pitch, that is have the same width. Advantageously, period $T_2$ of generator elements 8 is equal to period $T_1$ of generator elements 7.

According to one characteristic of the sensor 1, at least one of the tracks, namely track 6 in the illustrated example, includes at least one singular pole $P_S$ with at least one pair of singular generator elements 9 with a different spacing pitch in relation to the spacing pitch of the other generator elements 8. The singular generator elements 9 are also formed by alternating north and south magnetic poles, and are three in number in the illustrated example.

Of course, it is possible to envisage creating each magnetic track 5, 6 with generator elements of a variable magnetic field 7, 8, 9, formed by elements designed to disrupt a magnetic field created by a fixed element placed close to the said magnetic tracks. In this case, the disruptive elements can be constituted by means of teeth arranged in a ring made of a ferromagnetic material.

According to the invention, at least the detection cell, namely 4 in the illustrated example, located in relation to the magnetic track 6 with the singular pole $P_S$, is a single-element detection cell, meaning a cell delivering a unique signal which is a direct image of the variable magnetic field detected. This single-element cell differs from a so-called differential cell, which delivers a single signal resulting from the subtraction of two signals each corresponding to changes in the variable magnetic field taken at two different places. The detection cell, namely 3 in the illustrated example, located in relation to a track with only regular generator elements, can be a cell of the single-element or differential type. Each detection cell 3, 4 is a Hall-Effect cell, a differential Hall-Effect cell, or a flux concentrator, magneto-resistive or giant magneto-resistive Hall-Effect cell.

Advantageously, the detection cells 3, 4 and the logical processing resources form an integral part of an electronic microcircuit.

Each detection cell 3, 4 delivers an electrical signal corresponding to changes in the magnetic field of a track 5, 6 passing in front of the cell during the rotation of the coder 2. The signals delivered by the cells 3, 4 are de-phased, and are treated by the processing resources, so as to obtain digital signals A and B, each corresponding to each alternation of the north and south poles of the track, 5 and 6 respectively. For example, the signals delivered by cells 3, 4 are compared to preset electrical thresholds, so as to obtain digital signals A and B. As will be explained in the remainder of the description, cells 3, 4 or magnetic tracks 5, 6 are offset from each other to obtain two dephased digital electrical signals A and B, so as to obtain an output signal S with predetermined characteristics.

According to the invention, the generator elements 7, 8, 9 of the magnetic tracks 5, 6 and the detection cells 3 and 4 are arranged in relation to each other so that according to the logical processing applied to the digital signals A, B delivered by the measuring cells 3, 4, the output logical digital signal S has a constant period T. In this regard, it should be noted that the output signal S includes, firstly, a regular coding part $S_1$ with an alternating succession of low levels B1 of duration $t_{B1}$, and high levels H1 of duration $t_{H1}$, corresponding to a cyclic ratio of $R_1=t_{H1}/T$. Output signal S also includes an irregular coding part $S_2$ with at least one high level H2 of duration $t_{H2}$, and at least one low level $B_2$ of duration $t_{B2}$, corresponding to a cyclic ratio of $R_2=t_{H2}/T$.

As can be seen clearly from FIG. 1, detection of the trailing (falling) edges of the output signal S is used to obtain an output signal S with the same constant period T over the whole of its duration, meaning corresponding to the full range of rotation of the coder. Output signal S is therefore periodic, both on its regular coding part $S_1$ and on its irregular coding part $S_2$.

Of course, it is possible to envisage using the leading (rising) edges of the output signal S by modifying, in particular, the arrangement of the singular generator elements 9 and the logical processing of the digital signals A, B in order to obtain an output signal S with a constant period T over the whole of the circumference.

The generator elements 7, 8, 9 of the magnetic tracks 5, 6, and the detection cells 3, 4 are arranged in relation to each other, so that according to the logical processing applied to the digital signals A, B, the regular parts $S_1$ and irregular parts $S_2$ for coding of the digital output signal S have cyclic ratios $R_1$ and $R_2$ that are unbalanced and different from each other. A cyclic ratio is considered to be unbalanced if the cyclic ratio has a value that is other than 0.5, meaning that times $t_{H1}$ and $t_{B1}$ are not equal or that times $t_{H2}$ and $t_{B2}$ are not equal.

According to a preferred characteristic, it should be noted that the generator elements 7, 8, 9 of the magnetic tracks and the detection cells 3 and 4 are arranged so that, depending on the logical processing resources, the digital output signal S has a regular coding part $S_1$ whose unbalanced cyclic ratio $R_1$ is complementary to the unbalanced cyclic ratio $R_2$ of the irregular coding part $S_2$, meaning that $R_2=1-R_1$.

In the implementation example illustrated in FIG. 1, the regular coding part $S_1$ has a cyclic ratio of $R_1=0.7$, meaning that over a period T of this regular coding part $S_1$ the high signal represents 70% of the time and the low signal 30% of the time. For example, the cyclic ratio $R_1=0.7$ is achieved over 58 periods. Advantageously, the irregular coding part $S_2$ has a cyclic ratio of $R_2=0.3$, meaning that over the period T of this irregular coding part $S_2$, the high signal represents 30% of the time and the low signal 70% of the time. In the illustrated example, the cyclic ratio $R_2=0.3$ is achieved over two periods.

Of course, it is clear that it can be chosen to effect cyclic ratios with different and non-complementary values ($R_1 \neq 1-R_2$). For example, it can be chosen to obtain cyclic ratios such as $R_1=0.7$ and $R_2=0.4$.

In the example illustrated in FIG. 1, the logical processing resources are designed to apply the logical complementary "OR" or complementary "XOR" function to the de-phased digital signals A, B. The logical processing resources thus deliver an output signal S such that:

$S=\text{NOT}(A \text{ OR } B)=\text{NOT}(A \text{ XOR } B)$

In the example illustrated in FIG. 1, the detection cells 3 and 4 are aligned in a direction perpendicular to that of the motion of the tracks, while the tracks 5, 6 are offset from each other, meaning that the generator elements of the tracks are offset. In this regard, and in the illustrated example, the generator elements 7 and 8 of the same sign as the tracks 5 and 6 are offset from each other by a value equal to 30% of their width, thus corresponding to one of the constituent values of the cyclic ratio present in one of the parts $S_1$, $S_2$ of the digital output signal S.

Figure 1A:
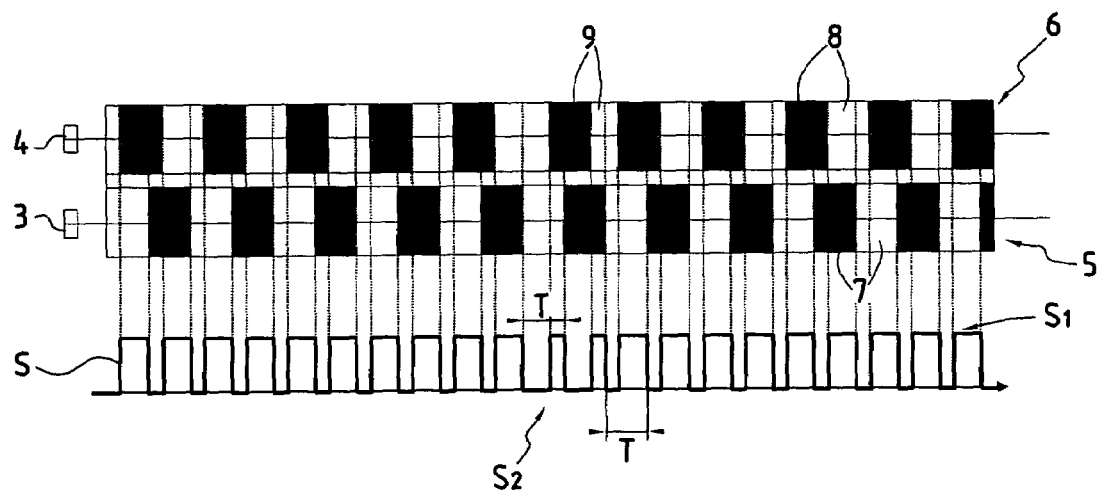
FIG. 1A illustrates a method of implementation of the example illustrated in FIG. 1.

FIG. 1A illustrates one particular method of implementation in relation to the example illustrated in FIG. 1, in which tracks 5 and 6 are offset from each other with a pitch in the opposite sense to that illustrated in FIG. 1. In this example, in FIG. 1A, the generator elements 7 of the track 5 are offset by 70% of their width in relation to the similar generator elements 8 of track 6, in a direction opposite to that of the offset illustrated in FIG. 1. The generator elements 7, 8, 9 of the tracks 5, 6 are arranged in the same manner as in the example illustrated in FIG. 1.

In addition, in the example illustrated in FIG. 1A, the logical processing resources take account of either one or other of the digital signals. Thus, the logical processing resources are designed to apply the logical function "OR" or "XOR" to the de-phased digital signals A, B. The logical processing resources thus deliver an output signal S such that:

$S=A \text{ OR } B=A \text{ XOR } B$

Figure 2:
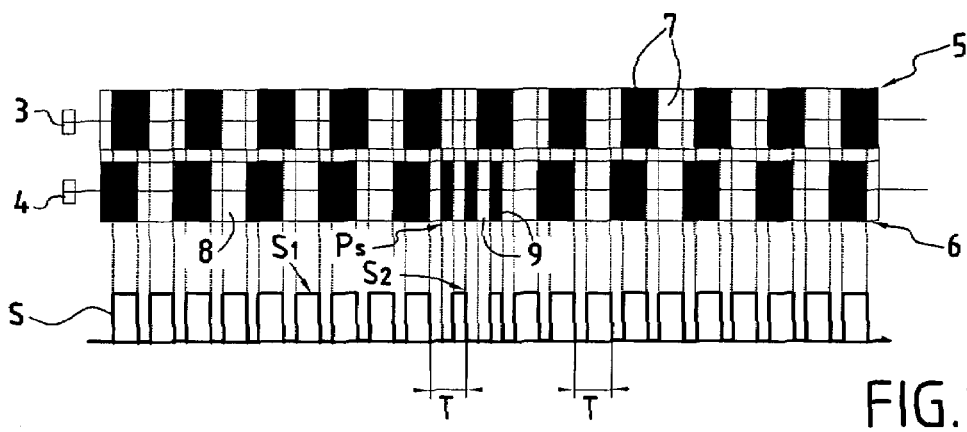
FIGS. 2 and 2A illustrate a second example of implementation of a sensor according to the invention created using two different methods.
Figure 2A:
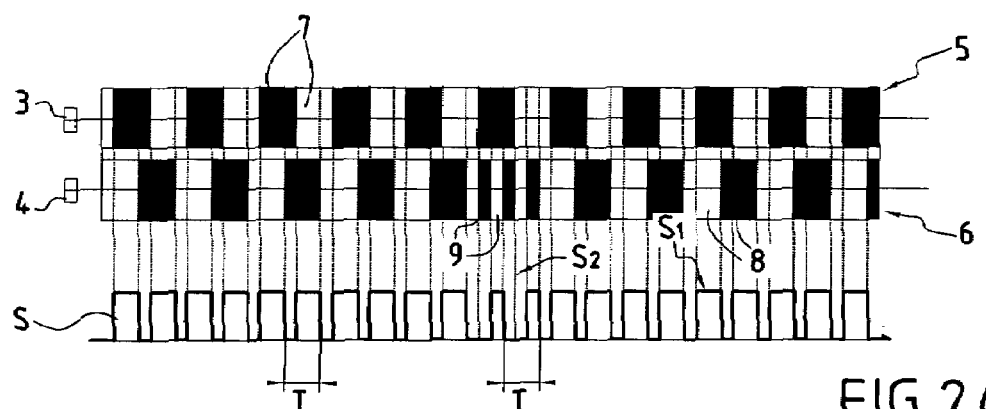

FIGS. 2 and 2A illustrate two different methods of implementation of a coder used to obtain an output signal S according to the invention, as described in FIG. 1.

In the examples illustrated in FIGS. 2 and 2A, tracks 5 and 6 have the same characteristics as tracks 5, 6 described in FIGS. 1 and 1A, though this is not the modification effected at the level of singular pole $P_S$. Thus, the offset between the generator elements 7, 8 of the tracks 5, 6 for FIGS. 2 and 2A correspond to the offset respectively in FIGS. 1 and 1A. The singular pole includes a greater number of pairs of singular generator elements 9. In the example illustrated in FIG. 2, the logical processing resources deliver an output signal S such that:

$S=\text{NOT}(A \text{ OR } B)=\text{NOT}(A \text{ XOR } B)$

In the example illustrated in FIG. 2A, the logical processing resources deliver an output signal S such that:

$S=A \text{ OR } B=A \text{ XOR } B$

Figure 3:
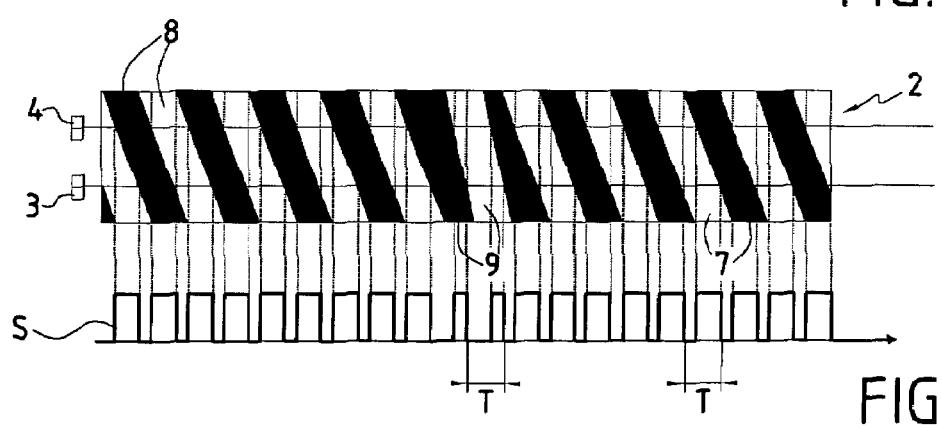
FIGS. 3 and 3A illustrate another example of implementation of a sensor according to the invention created by two different methods.
Figure 3A:
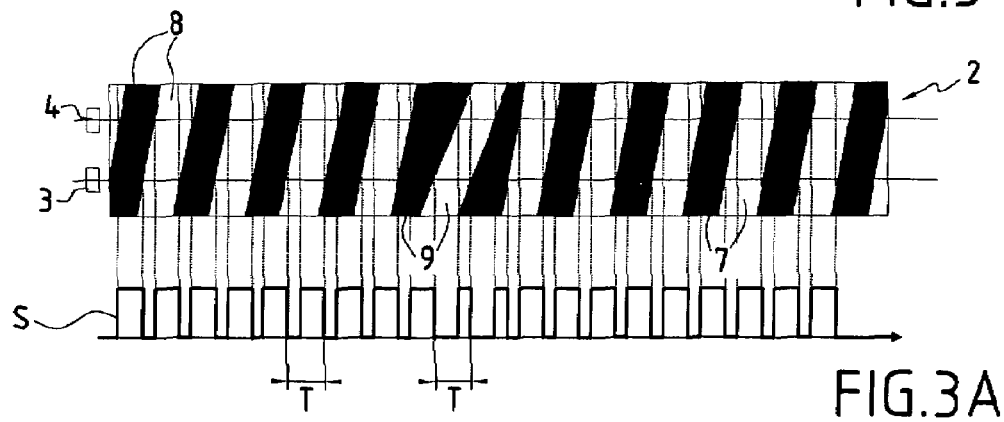

FIGS. 3 and 3A illustrate two methods of implementation of a coder 2 whose generator elements 7, 8, 9 are continuous from one track to the other. The generator elements 7, 8, 9 are formed by alternating north and south magnetic poles extending in an inclined manner in relation to the direction of movement of the coder. The magnetic poles forming the generator elements 7, 8 are of constant thickness, while at least some of the magnetic poles forming the singular generator elements 9 have a thickness that increases or decreases in the direction of the edges of the coder.

In the example illustrated in FIG. 3, the logical processing resources apply the logical function "OR" or "XOR" to the de-phased digital signals A, B so that the output signal S is such that:

$S=A \text{ OR } B=A \text{ XOR } B$

In the example illustrated in FIG. 3A, in which the magnetic poles are inclined in the opposite direction in relation to their inclination illustrated in FIG. 3, the logical processing resources apply logical processing to the de-phased digital signals A, B such that:

$S=\text{NOT}(A \text{ OR } B)=\text{NOT}(A \text{ XOR } B)$

Figure 4:
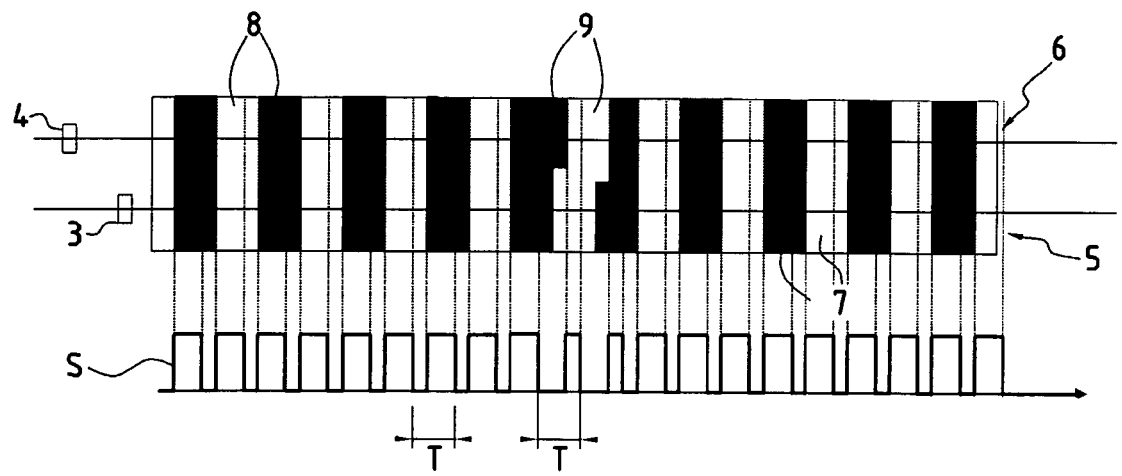
FIGS. 4 and 4A illustrate another example of implementation of a sensor according to the invention created by two different methods.
Figure 4A:
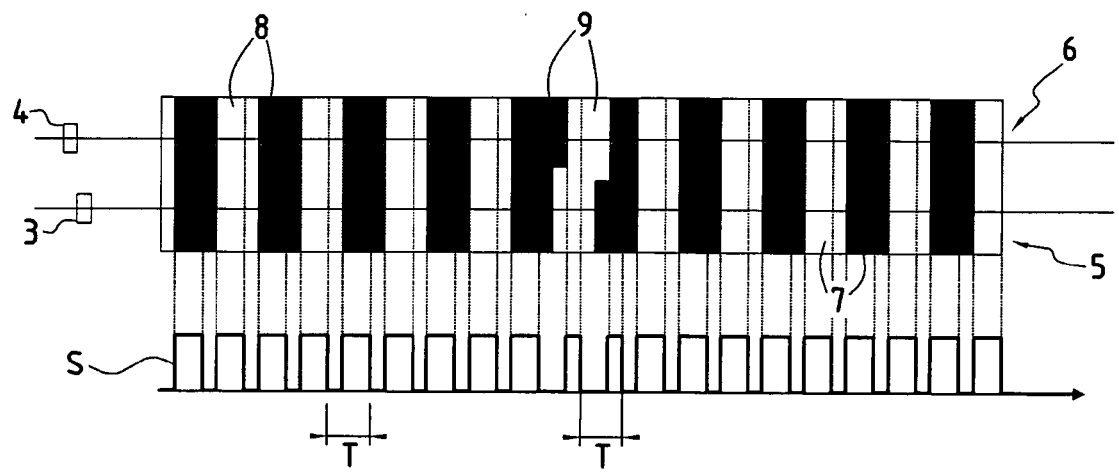

FIGS. 4 and 4A illustrate two methods of implementation of a sensor whose cells 3, 4 are offset from each other in the direction of movement of the coder according to two distinct values. According to these examples, the generator elements 7, 8 of the two tracks 5, 6 are formed by magnetic north and south poles that are common to the two tracks and that lie crosswise in relation to the direction of movement of the coder. The magnetic north and south poles are of constant and identical thickness. The singular generator elements 9 are formed by magnetic north and south poles of different widths.

In the example illustrated in FIG. 4, the logical processing resources apply the logical function "OR" or "XOR" to the de-phased digital signals A, B, so that the output signal S is such that:

$S=A \text{ OR } B=A \text{ XOR } B$

In the example illustrated in FIG. 4A, the logical processing resources apply a logical function to the de-phased digital signals A, B such that:

$S=\text{NOT}(A \text{ OR } B)=\text{NOT}(A \text{ XOR } B)$

Advantageously, the coder 2, as described above, is intended to be mounted on a rotating target in the general sense, from which at least one position is determined. According to a preferred implementation characteristic, the coder 2 according to the invention is intended to be mounted on a drive pulley mounted at he output of the vehicle engine, that is on a distribution pulley or on one of the auxiliary pulleys. According to an advantageous characteristic, the coder 2 is mounted on the drive pulley located in the axis of the crankshaft, so as to allow detection of the top dead centre point in the ignition of a cylinder.

It should be noted that the subject of the invention can also be applied to the implementation of a sensor with a magnetic ring fitted with several irregular poles that can be used to locate several positions. Advantageously, the magnetic ring includes, for example, four irregular poles that can be used to locate the position of the cylinders of an engine. In this case, the coder is mounted solidly on the camshaft of a vehicle engine. Of course, the coder can equally well be mounted on the camshaft with a single irregular pole.

According to another preferred implementation characteristic, the coder according to the invention is intended to be mounted inside a support plate for a dynamic sealing gasket for a transmission shaft, mounted between the crankshaft and the gearbox of a vehicle engine. The coder is driven in rotation by the transmission shaft and is mounted in the vicinity of the detection cells mounted on the support plate of the sealing gasket, so as to constitute a position sensor.

According to another preferred implementation characteristic, the coder is fixed in rotation on a shaft of a vehicle engine, or is driven in rotation by the crankshaft or the camshaft of a vehicle engine, being mounted inside the engine block of such a vehicle, close to a detection cell, so as to constitute a position or speed sensor.

The invention is not limited to the examples described and shown above, since various modifications can be made to it without moving outside of its framework.

What is claimed is:

1. A sensor comprising:
   at least one rotary magnetic coder comprising a first circular magnetic track formed by a series of generator elements of a variable magnetic field, distributed so as to form $N_1$ element pairs with a specified period $T_1$, and a second circular magnetic track formed by a series of generator elements of a variable magnetic field, distributed so as to form $N_2$ element pairs with a specified period $T_2$, at least one of the magnetic tracks having at least one singular pole $P_S$ with at least one pair of singular generator elements with a spacing pitch different from the spacing pitch of the other generator elements of the track,
   at least two detection cells, each of said cells placed in relation to one said magnetic track and each delivering an electrical signal corresponding to changes in intensity of magnetic field, the detection cells or the magnetic tracks being offset from each other to allow the production of two de-phased digital signals, and
   logical resources for processing of digital signals delivered by the cells, said logical resources delivering a digital output signal with, a regular coding part $S_1$ having an alternating succession of high levels and low levels corresponding to a specified cyclic ratio $R_1$ and an irregular coding part $S_2$ with at least one high level and one low level corresponding to a specified cyclic ratio $R_2$,
   wherein at least the detection cell located in relation to the magnetic track with a singular pole $P_S$ is a single-element detection cell, and
   the generator elements of the magnetic tracks and the detection cells are arranged in dependence on the logical processing resources, such that the digital output signal has a constant period, both on the regular coding part $S_1$ and on the irregular coding part $S_2$, the regular coding part $S_1$ and the irregular coding part $S_2$ having cyclic ratios $R_1$, and $R_2$ that are unbalanced and different from each other.

2. A sensor according to claim 1, wherein the generator elements of the magnetic tracks and the detection cells are arranged such that the digital output signal has a regular coding part $S_1$ with unbalanced cyclic ratio $R_1$ which is complementary to the unbalanced cyclic ratio $R_2$ of the irregular part $S_2$.

3. A sensor according to claim 2, wherein the detection cells or the magnetic tracks are offset from each other by an amount which is a function of the unbalanced cyclic ratio $R_1$ or $R_2$.

4. A sensor according to claim 1, wherein at least one magnetic track includes at least one singular pole $P_S$, while the other track has only element pairs with the specified period $T_1$.

5. A sensor according to claim 1, wherein the $N_1$ pairs of generator elements of the first magnetic track have a period $T_1$ equal to the period $T_2$ of the $N_2$ pairs of generator elements of the second magnetic track.

6. A sensor according to claim 1, wherein the logical processing resources take account of a digital signal from one of the detection cells, or a complement of one of digital signals.

7. A sensor according to claim 1, wherein the generator elements are formed by alternating north and south magnetic poles.

8. A sensor according to claim 7, wherein the alternating north/south magnetic poles extend in a continuous manner and inclined in relation to a direction of movement of the coder, the magnetic poles forming the generator elements being of constant thickness, with at least some singular generator elements having a thickness that increases or decreases in the direction of coder edges.

9. A sensor according to claim 7, wherein the generator elements of the two tracks are formed by common alternating north and south magnetic poles, extending crosswise in relation to a direction of movement of the coder, with the singular generating elements being formed by alternating north/south magnetic poles of different widths, with the cells offset from each other in the direction of movement of the coder.

10. A sensor according to claim 1, wherein each detection cell is a Hall-Effect cell, a differential Hall-Effect cell, or a flux concentrator, magneto-resistive, or giant magneto-resistive Hall-Effect cell.

11. A sensor according to claim 1, wherein the detection cells and the logical processing resources form an integral part of an electronic microcircuit.

12. A sensor according to claim 1, wherein the magnetic coder is fixed in rotation on a shaft of a vehicle engine.

* * * * *